United States Patent [19]

Schlitt

[11] Patent Number: 4,830,335
[45] Date of Patent: May 16, 1989

[54] PORTABLE JACK

[76] Inventor: John J. Schlitt, R.R. #4, Site 20, Comp. 21, Prince George, British Columbia V2N 2J2, Canada

[21] Appl. No.: 149,841

[22] Filed: Jan. 29, 1988

[51] Int. Cl.⁴ .............................................. B60P 1/10
[52] U.S. Cl. ..................................... 254/7 B; 269/17
[58] Field of Search ......................... 414/495; 269/17;
254/3 R, 3 B, 3 C, 7 R, 7 B, 7 C, 2 R, 2 B, 2 C

[56] References Cited

U.S. PATENT DOCUMENTS 1,909,023  5/1933  Statz .
2,398,584  4/1946  Goodrich ........................ 254/3 R
2,702,689  2/1955  Smith .
2,814,099  11/1957 Knittel .
3,102,648  9/1963  Hughes ............................ 414/495
3,109,625  11/1963 Arnes et al. .
3,391,905  7/1968  Burns ............................... 254/7 B Primary Examiner—Robert C. Watson
Attorney, Agent, or Firm—Christie, Parker & Hale

[57] ABSTRACT

A portable jack comprising a wheeled base and a support structure pivotably attached to the base. The support structure is pivotable from a lowered position in which the support structure is essentially co-planar with the plane of the base to an upright position in which the support structure is essentially perpendicular to the base. The support structure comprises spaced parallel guide members having hinged ends connected to the base to allow pivoting of the support structure. A locking device is provided to lock the support structure in an upright position. The support structure uses a carriage member which moves slidably along the guide members to support an article to be lifted.

9 Claims, 3 Drawing Sheets

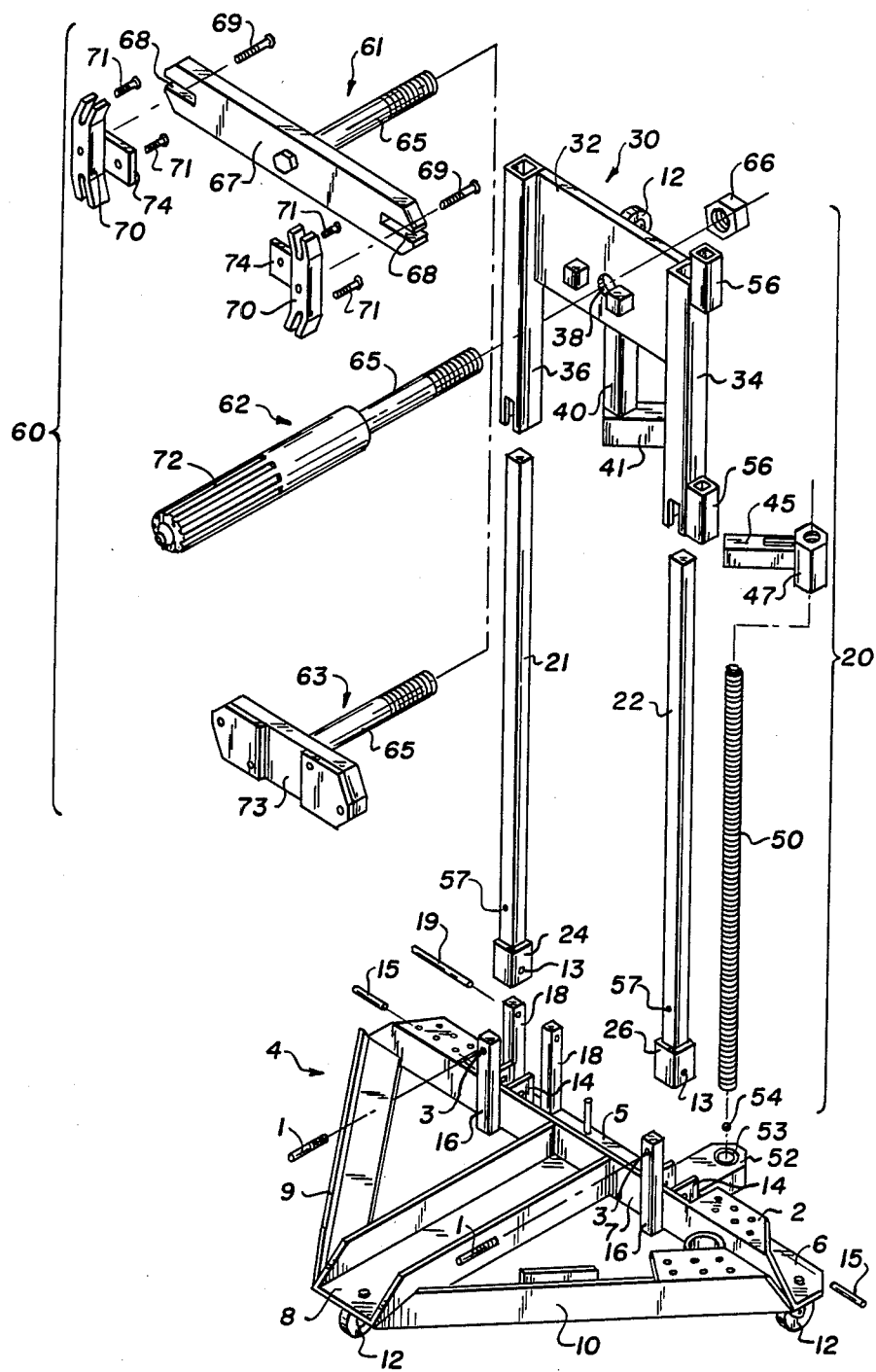

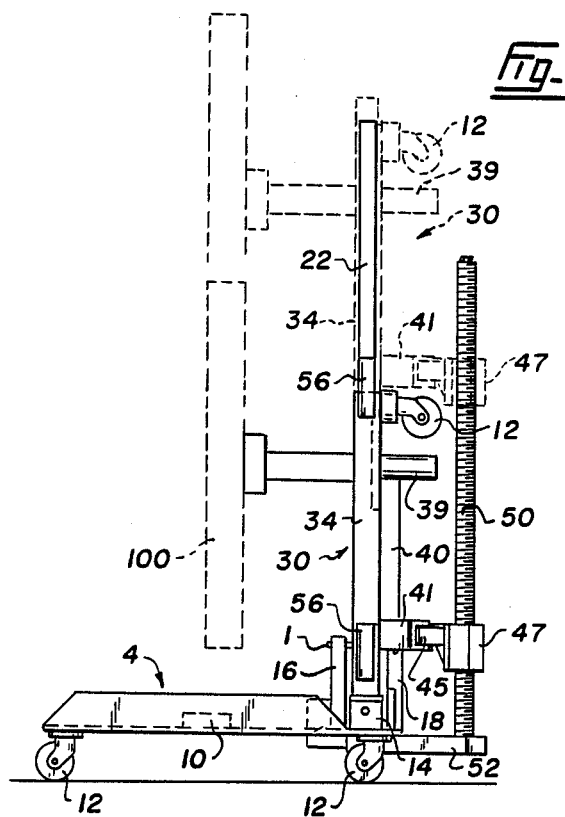
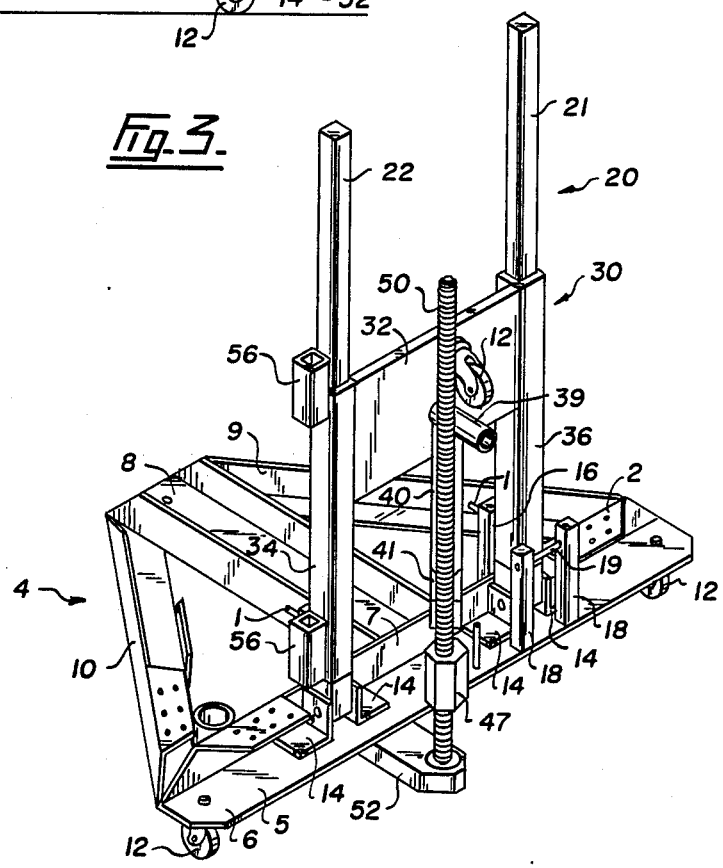

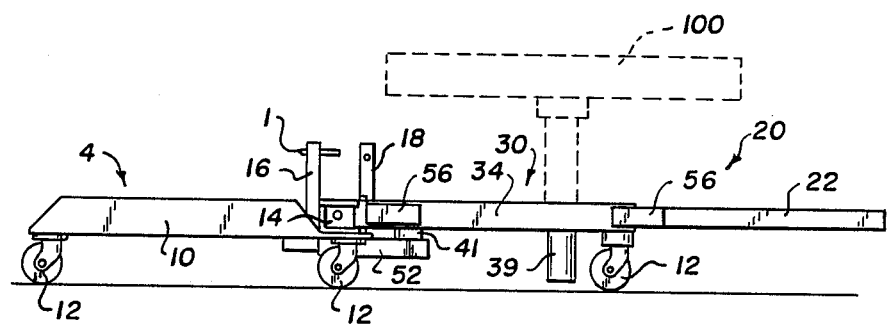
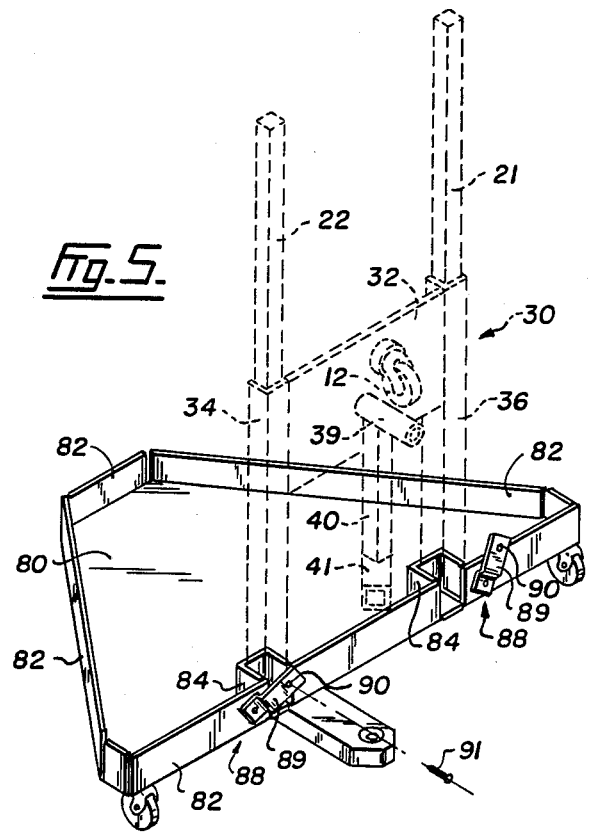

PORTABLE JACK

FIELD OF THE INVENTION

This invention relates to a portable jack which finds particular application in the heavy duty automotive maintenace industry in handling heavy components.

BACKGROUND OF THE INVENTION

Lifting devices or jacks for handling heavy equipment are well known. Such devices find particular application in the automotive or truck maintenance industry where it is often necessary to install or remove heavy components such as planetary devices, clutch assemblies, brakesavers, flywheels or flywheel housings.

Various prior art heavy component handling devices are known to applicant. U.S. Pat. No. 2,814,099 to Knittel discloses an adjustable stand and cradle for handling transmissions. U.S. Pat. No. 1,909,023 to Statz discloses a transmission jack which is compact in design so as to occupy a minimum of space beneath a vehicle. U.S. Pat. No. 2,702,689 to Smith discloses a vehicle dolly arrangement to support a differential unit. U.S. Pat. No. 3,109,626 to Arnes et al. discloses a jack for servicing transmissions, differentials and similar units of various types.

Despite the presence of the prior art devices, it is still common in the industry to manually install heavy components. For example, flywheel assemblies that weigh approximately 150 pounds are often installed by a mechanic lying on his back under a truck with the assembly resting on his chest. He then manually lifts the assembly up to the housing where a second mechanic pushes the assembly horizontally into the housing. Unfortunately this procedure often results in back and hand/finger injuries. If the assembly falls, stomach and chest injuries are possible.

SUMMARY OF THE INVENTION

The present invention is a portable jack which eliminates the awkward and potentially hazardous manual installation process described above. The jack of the present invention allows the mechanic to do the job in far less time and in a much safer manner than the traditional manual method.

Accordingly, the present invention is a portable jack comprising:
a wheeled base;
a support structure pivotably attached to said base and pivotable from a lowered position in which said support structure is essentially co-planar with the plane of said base to an upright position in which said support structure is essentially perpendicular to said base;
said support structure comprising spaced parallel guide members having hinged ends connected to said base to allow pivoting of the support structure, means to lock said support structure in an upright position, a carriage member which moves slidably along said guide members with means to secure an article to be lifted to said carriage member, and means to slidably move said carriage member along said guide members.

The present invention provides a portable jack of compact design that can be used to support and move heavy equipment.

The pivoting nature of the support structure allows the present invention to be manoeuvered under a vehicle when the support structure is in its lowered position and upon raising the support structure to a vertical position under the vehicle, the carriage member can be used to position various pieces of equipment such as clutch or flywheel assemblies for attachment to the vehicle. Such an arrangement allows a mechanic to quickly and safely install a bulky or heavy piece of equipment by himself without any assistance.

Various securing means are provided with the present invention to allow different pieces of equipment to be supported such as clutch or flywheel assemblies or similar heavy and bulky equipment.

DESCRIPTION OF THE DRAWINGS

Various embodiments of the present invention are shown in the following drawings in which:

FIG. 1 shows an exploded view of an embodiment of the invention.

FIG. 2 shows the vertical movement of the carriage assembly.

FIG. 3 is a view of the present invention taken from a different angle.

FIG. 4 shows the support structure of the present invention in it lowered position.

FIG. 5 shows a second embodiment of the present invention.

DESCRIPTION OF THE PREFERRED EMBODIMENTS

Referring to FIG. 1, there is shown an exploded view of a first embodiment of the present invention. The device comprises wheeled base 4 having a pivotaly attached support structure 20 to which can be mounted various means 60 for securing a piece of equipment to be supported.

In the present embodiment, wheeled base 4 is an essentially triangular structure formed from angle iron stock. Main member 5 has a horizontal surface 6 which is bent upwardly along its front edge to create vertical surface 7. Midway along the length of the main member 5, extension arm 8 having a U shaped cross-section extends perpendicularly from the front face of vertical surface 7. Bracing members 9 and 10 extend between the ends of main member 5 and the end of extension arm 8 to form the essentially triangular shape of the base 4. All the structural members of the base may be welded together or otherwise suitably joined. Conventional pivoting wheels 12 are attached at the vertices of the triangular base forming a tripod wheel arrangement to allow easy movement of the entire device. Various perforated plates 2 can also be welded to the members comprising the base to act as holding racks for storing bolts and pins. As well, the central cavity of U-shaped member 8 and the horizontal surfaces of bracing members 9 can be used to store equipment and securing means 60 that are not in use.

Support structure 20 comprises spaced parallel guide members 21 and 22 and carriage member 30.

Guide members 21 and 22 terminate at their lower ends in enlarged portions 24 and 26 having holes 13 therethrough. As best shown in FIG. 3, enlarged portions 24 and 26 are accepted between two pairs of hinge plates 14 that are welded to the horizontal 6 and vertical 7 surfaces of main member 5. Hinge pins 15 are inserted through the appropriate holes in the hinge plates and through aligned holes 13 in the enlarged portions 24 and 26 to pivotally connect guide members 21 and 22 and therefore support structure 20 to welded base 4. As shown in FIG. 1, stop posts 16 are welded to the vertical surface 7 in front of each hinge mount. As well, locking means are provided to lock the support structure in an upright position as desired. Two spaced locking posts 18 are mounted to the outer edge of horizontal surface 6 of main member 5 on either side of at least one of the guide members 21 or 22. These locking posts have holes drilled through them to accept a removable locking pin 19 which straddles the distance between the two posts and, when in place, prevents guide members 21 and 22 from rotating about their pivotal connection to wheeled base 4. Preferably, locking pin 19 is attached to a locking post 18 or to wheeled base 4 by a chain so that it cannot be misplaced.

In addition or as alternative locking means, stop posts 16 may be provided with holes 3 to accept bolts 1 which can be tightened into aligned and correspondingly threaded holes 57 in the front surface of guide members 21 and 22 in order to provide further locking means to ensure the support structure is held in its vertical position.

FIG. 4 illustrates the pivoting ability of the support structure 20 from a lowered position where the support structure is in essentially the same plane as the wheeled base. From this position, the support structure can be raised to an essentially vertical position where the support structure is essentially perpendicular to the base, at which point the support structure can be locked into place as previously described.

Carriage member 30 comprises a mounting plate 32 with attached tubular elements 34 and 36 at either edge shaped to fit slidably over guide members 21 and 22. Mounting plate 32 is formed with aperture 38 therethrough to accept the attachment shaft of the various securing means 60. As best shown in FIG. 3, aperture 38 communicates with hollow tubular member 39 extending essentially perpendicularly from the rear face of plate 32. The rear face of mounting plate 32 has an attached pivoting wheel 12 to support the weight of the support structure 20 and any supported equipment when the support structure is in a lowered position as shown in FIG. 4. As well, the rear face of mounting plate 32 is equipped with vertical member 30 extending downwardly from mounting plate 32 and terminating in horizontally extending arm 41 that is mounted at a skewed angle to the vertical axis of member 40. Arm 41 is formed with a cavity to accept arm 45 extending from threaded housing 47. Threaded housing 47 is received on threaded shaft 50 and provides the means to slidably move carriage member 30 along guide members 21 and 22. The lower end of threaded shaft 50 is supported in holding arm 52 which is rigidly attached to main member 5 of base 4. Holding arm 52 is formed with a cavity to accept and hold a suitable bearing member 53. Preferably the lower end of threaded shaft 50 has a ball bearing 54 attached by welding which is inserted into bearing member 53 thereby allowing for free rotation of threaded shaft 50. Necessarily, arm 45 of threaded housing 47 can be removed from the cavity in arm 41 to allow threaded shaft 50 to be removed from holding arm 52 so that support structure 20 can be lowered. When threaded shaft 50 is not being used, tubular sections 56 welded to the side of tubular element 34 provide a convenient storage location into which the threaded shaft 50 can be inserted.

FIG. 2 demonstrates the manner in which threaded shaft 50 is used to move carriage member 30 up and down along guide rails 21 and 22 in order to raise and lower any supported equipment 100. Threaded housing 47 is positioned on threaded shaft 50 so that arm 45 is engaged in the cavity of horizontally extending arm 41. By applying appropriate rotary motion to threaded shaft 50 so as to cause the shaft to rotate in bearing 53, threaded housing 47 can be made to move up and down threaded shaft 50. Such a motion is transferred by arm 45 engaging the cavity of arm 41 to carriage member 30 and any supported equipment 100. In FIG. 2, the apparatus of the present invention is shown in solid lines with carriage member 30 in a lowered position with tubular elements 34 and 36 resting atop the enlarged end portions 24 and 26 of guide rails 21 and 22. The same carriage member is shown by dotted lines at its uppermost position. From the foregoing, it is obvious that threaded shaft 50 can be rotated so as to position supported equipment 100 at any level between the upper and lower travel limits of the carriage member 30.

Returning to FIG. 1, there are shown means 60 for securing an article to be lifted to the device of the present invention. Securing means 61 allows a flywheel assembly to be supported by the present device. Securing means 62 allows for a clutch assembly to be supported by the present invention, and securing means 63 provides a general support plate. The present invention is not limited to lifting clutch and flywheel assemblies. In order to adapt the present invention for use with other equipment it is simply a matter of designing an appropriate securing means 60.

All securing means 60 are equipped with an attachment shaft 65 having a threaded portion at one end. Shaft 65 is inserted into hole 38 and is of such as length as to extend through tubular member 39 to expose the threaded portion. Nut 66 can be tightened onto the threaded portion to positively locate securing means 60 to the carriage member 30.

Securing means 61 is used to secure a flywheel assembly to the present invention. Attached to attachment shaft 65 is spanning member 67 having slots 68 at each end extending a distance along the longitudinal axis of the spanning member. Slots 68 receive bolts 69 which engage hole in tabs 74 extending from slotted arcuate arms 70. Spanning member 67 is positioned across a diameter of the flywheel and slotted arcuate arms 70 are positioned about the rim of the flywheel by sliding bolts 69 in slots 68. Bolts 71 in the slotted arcuate arms 70 are then aligned with bolt holes in the flywheel rim and tightened into place in order to releasably join the flywheel and the securing means 60.

Securing means 62 is provided to secure a clutch assembly to the present invention. Attachment shaft 65 extends into a splined shaft 72 for insertion into the central splined opening of a clutch assembly. Various diameter shafts can be constructed for use with different sizes of clutch.

Securing means 63 comprises a bearing plate 73 attached to the end of attachment shaft 65. Bearing plate 73 is provided with holes therethrough arranged in a pattern to allow for attachment to an article to be lifted.

A further embodiment of the present invention is shown in FIG. 5. The illustrated embodiment uses a different wheeled base and locking means than the apparatus of FIGS. 1 through 4. The wheeled base of FIG. 5 uses an essentially triangular plate 80 with upturned edges 82 to define a central enclosure for storing equipment and assorted spare parts. Hinge mounts 84 are formed in an upturned edge 82 of the wall to accept the pivotable guide members 21 and 22. Locking means 88 for locking the support structure in an upright position comprises a pivotable arm 89 attached to an upturned edge 82 adjacent at least one guide member 21 or 22. The pivotable arm 89 is formed with a hole 90 therethrough and is pivotable between an unlocked position shown on the right and a locked position shown on the left where the pivotable arm 89 is rotated to align hole 90 with a threaded hole in the rear face of the guide member. A bolt 91 is inserted through hole 90 and tightened into the threaded hole to lock the guide member and therefore the entire support structure into a vertical position.

The present invention finds particular application in installing and removing clutch and flywheel assemblies on large trucks. Use of the present invention in such situations makes jacking the vehicle or using a working pit to gain access to the underside of the vehicle unnecessary. The awkward and potentially dangerous manual method of installing such components is also avoided. To install a clutch or flywheel, the present invention is fitted with appropriate securing means 60, and the support structure 20 is placed in its lowered position. The clutch or flywheel is then loaded onto the securing means 60 and firmly attached. The device of the present invention is then rolled and positioned under the vehicle being worked on, conventional pivoting wheels 12 allowing for free and easy movement. Support structure 20 is then pivoted upwardly to its vertical position and locked in place. The open space of the truck's transmission tunnel provides adequate clearance for the raised support structure. At this point carriage member 30 with an attached clutch or flywheel rests at its lowest position on guide members 21 and 22. Threaded shaft 50 and threaded housing 47 and then used to raised the carriage member 30 to an appropriate height so that the clutch or flywheel can be aligned with the mounting means of the truck. The clutch or flywheel is then mounted in its conventional location on the truck and securing means 60 is released. Support structure 20 can then be lowered and the portable jack removed from beneath the vehicle.

The above procedure can be reversed for removing a clutch or flywheel assembly.

I claim:

1. A portable jack comprising:
   a wheeled base;
   a support structure pivotably attached to said base and pivotable from a lowered position in which said support structure is essentially co-planar with the plane of said base to an upright position in which said support structure is essentially perpendicular to said base;
   said support structure comprising spaced parallel guide members having hinged ends connected to said base to allow pivoting of the support structure, means to lock said support structure in an upright position, a carriage member which moves slidably along said guide members with means to secure an article to be lifted to said carriage member, and means to slidably move said carriage member along said guide members, said carriage member being fitted with a wheel so that when said support structure is co-planar with said wheeled base, said wheel of said carriage member will support the weight of said carriage member.

2. An apparatus as claimed in claim 1 in which said means to slidably move said carriage member along said guide members comprises a threaded member rotatably supported at its lower end by said base, said threaded member having a correspondingly threaded housing mounted thereon adapted to engage said carriage member whereby rotation of said threaded member causes said housing to move along said threaded member thereby moving said slidable carriage along said guide rails.

3. An apparatus as claimed in claim 1 in which said means to lock said support structure in an upright position comprises a locking member mounted to said base so as to engage at least one of said guide members above said hinged end of said guide member thereby locating and holding said guide member in an upright position by preventing rotation of said guide member about said hinged end.

4. An apparatus as claimed in claim 3 in which said locking member comprises a pivoting member mounted to said support base and pivotable between a rest position and a locking position in which said pivoting member is threadedly attached to at least one of said guide members so as to prevent said guide member rotating about its hinged end.

5. An apparatus as claimed in claim 3 in which said locking member comprises a longitudinal member that is removably inserted through aligned openings in a pair of spaced posts attached to said base on either side at least one of said guide members, said longitudinal member in spanning the distance between said posts contacting a surface of said guide member so as to present a barrier to the movement of said guide member.

6. An apparatus as claimed in claim 3 in which said locking member comprises a longitudinal member that is removably inserted through a first opening in a post attached to said base and adjacent one of said guide members, said first opening being aligned with a second opening in said guide member, whereby insertion of said longitudinal member through said first opening and into said second opening prevents movement of said guide member.

7. An apparatus as claimed in claim 6 in which said longitudinal member is a bolt and said second opening is correspondingly threaded to accept said bolt.

8. An apparatus as claimed in claim 1 in which said means to secure an article to be lifted comprises a splined member releasably mounted to said carriage member to engage the central splined opening of a clutch.

9. An apparatus as claimed in claim 1 in which said means to secure an article to be lifted comprises a spanning member releasably mounted to said carriage member and adapted to fit across the diameter of a flywheel having adjustable clamping member to engage the inner or outer periphery of a flywheel in order to hold and support the flywheel.

* * * * *